(12) United States Patent
Chaudhari et al.

(10) Patent No.: US 7,363,223 B2
(45) Date of Patent: Apr. 22, 2008

(54) POLICY ANALYSIS FRAMEWORK FOR CONVERSATIONAL BIOMETRICS

(75) Inventors: Upendra V. Chaudhari, Briarcliff Manor, NY (US); Ganesh N. Ramaswamy, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 10/917,992

(22) Filed: Aug. 13, 2004

(65) Prior Publication Data

US 2006/0036443 A1   Feb. 16, 2006

(51) Int. Cl.
*G10L 17/00* (2006.01)
(52) U.S. Cl. .......................... 704/246; 726/6
(58) Field of Classification Search ........ 704/246–250; 726/5–6
See application file for complete search history.

(56) References Cited

U.S. PATENT DOCUMENTS

| | | | | |
|---|---|---|---|---|
| 5,339,385 | A * | 8/1994 | Higgins | 704/246 |
| 5,526,465 | A * | 6/1996 | Carey et al. | 704/250 |
| 5,913,196 | A * | 6/1999 | Talmor et al. | 704/270 |
| 6,195,634 | B1 * | 2/2001 | Dudemaine et al. | 704/231 |
| 6,691,089 | B1 * | 2/2004 | Su et al. | 704/244 |
| 7,039,951 | B1 * | 5/2006 | Chaudhari et al. | 726/7 |
| 2004/0236573 | A1 * | 11/2004 | Sapeluk | 704/224 |

OTHER PUBLICATIONS

Navratil et al, "An instantiable speech biometrics module with natural language interface: Implementationin the telephony environment", In proc. of the International Conference on Acoustics, Speech, and Signal Processing (ICASSP), Istanbul, Turkey, Jun. 2000, pp. 1097-1100.*
Campbell, "Speaker Recognition: A Tutorial", Proc. of the IEEE, vol. 85, No. 9, Sep. 1997, pp. 1437-1462.*
Ganesh N. Ramaswamy, Ran D. Zilca, Oleg Alecksandrovich; "A Programmable Policy Manager For Conversational Biometrics" ; IBM Thomas J. Watson Research Center Yorktown Heights, New York; 4 pages.
Larry P. Heck and Dominique Genoud; "Combining Speaker And Speech Recognition Systems" ; Nuance Communications, 1380 Willow Road, Menlo Park, CA 94025; pp. 1369-1372.
U. Chaudhari, J. Navrátil, G. Ramaswamy, and R.D. Zilca; :"Future Speaker Recognition Systems-Challenges and Solutions"; IBM T.J. Watson Research Center, Yorktown Heights, New York; 2 pages.
Ganesh N. Ramaswamy, Jiří Navrátil; Upendra V. Chaudhari; Ran D. Zilca; The IBM System For The NIST-2002 Cellular Speaker Verification Evaluation; IBM T.J. Watson Research Cent Yorktown Heights, New York 10598; 4 pages.
Douglas A. Reynolds, Thomas F. Quatieri, and Robert B. Dunn; "Speaker Verification Using Adapted Gaussian Mixture Models[1]"; M.I.T. Lincoln Laboratory, 244 Wood St., Massachusetts 02420; p. 19-41.

* cited by examiner

*Primary Examiner*—Patrick N. Edouard
*Assistant Examiner*—James S. Wozniak
(74) *Attorney, Agent, or Firm*—Anne Dougherty, Esq.

(57) ABSTRACT

The present invention describes a framework for the analytical and visual analysis and tuning of complex speaker verification systems guided by a policy finite state machine. The Receiver Operating Curve associated with the acoustic speaker recognition task is transformed into a multi-dimensional Receiver Operating Map (ROM), which results from a probabilistic analysis of the policy state machine. A Detection Cost Function (DCF) Map can be similarly generated. Results indicating that optimization over this surface (or the ROM) is an appropriate way to set thresholds are given.

20 Claims, 3 Drawing Sheets

P(accept) for Target, Informed Imposter, and Uninformed Imposter (ROM) Probability of Accept Surfaces (l = −0.5)

Example Policy State Machine

POLICY ANALYSIS FRAMEWORK FOR CONVERSATIONAL BIOMETRICS

FIELD OF THE INVENTION

The present invention relates to a system and method for Conversational Biometrics and more specifically to a policy for guiding Conversational Biometrics.

BACKGROUND OF THE INVENTION

Conversational Biometrics technology enables a non-intrusive and highly accurate mechanism for determining and authenticating speaker identities, based on the analysis of their voice. Conversational Biometrics combines acoustic text-independent speaker recognition with additional verification sources such as spoken knowledge to create the most flexible and robust speaker verification and detection.

Unlike other biometrics, voice contains multiple sources of information that can be acquired using existing ubiquitous infrastructure and used for recognizing and verifying speaker identities. The primary source is the speaker's voiceprint, which can be analyzed purely from an acoustic perspective, without considering the content being spoken. In addition to the voiceprint, voice also contains information on speaker's knowledge, and with an integrated conversational interface, the same voice can be analyzed twice: once for voiceprint match, and again for knowledge match.

Contemporary speaker recognition systems, such as those described in G. N. Ramaswamy, R. D. Zilca, O. Alecksandrovich, "A Programmable Policy Manager For Conversational Biometrics", EUROSPEECH-2003, Geneve, Switzerland, September, 2003, hereinafter referred to as ("Ramaswamy") and L. P. Heck, D. Genoud, "Combining Speaker and Speech Recognition Systems", ICSLP 2002, Denver, September, 2002, depend on a multiplicity of information sources which provide evidence for the assessment of a speaker's identity. Conversational Biometrics is one such system (see Ramaswamy); it relies on a speaker's acoustic characteristics as well as the speaker's anticipated level of knowledge. Chief among the benefits of this approach are:

The ability to compensate for corruption of any one source; and

Increased confidence in the result due to independent corroborative information, as described in Ramaswamy and U. V. Chaudhari, J. Navratil, G. N. Ramaswamy, R. D. Zilca "Future Speaker Recognition Systems: Challenges and Solutions", Proc. of AUTOID-2002, Tarrytown, N.Y., March 2002.

It is also possible that the various sources could provide contradictory evidence, which on the surface would make the results inconclusive. However, context may be able to disambiguate the results.

Thus, to effectively use all of the information available, there must exist a method for reconciling such contradictory evidence in a policy that guides the analysis of a Conversational Biometrics verification system.

SUMMARY OF THE INVENTION

The present invention presents a method for analyzing an analysis guiding policy within the context of Conversational Biometrics verification architecture. A multi-dimensional Receiver Operating Map (ROM) is generated as a transformation of the acoustic Receiver Operating Curve (ROC) under the operation of the verification policy. Each dimension of the input vector represents a separate parameter, such as a threshold, and the output can be either the probability of ending up in the "accept" state or the "reject" state. In addition to the acoustic ROC data, the analysis of the policy requires estimates of the probability of incorrect answers to the posed questions, which are dependent on whether a target or non-target user is assumed. Optimization over the map can be used to set system parameters, such as the thresholds.

The present invention discloses a method of visually and analytically assessing error rates associated with policy based procedures for verification, such as Conversational Biometrics, of a plurality of known speakers, evolution of the procedures being controlled by a state machine, wherein each of the plurality of known speakers has an associated acoustic component and a knowledge profile, the method including performing policy based verification using a finite state machine defined by a set of states, each state having a specified set of questions and a plurality of possible state transitions, a state transition is performed if a transition path condition associated with it is satisfied, the transition path condition includes a plurality of variables and a plurality of constants; generating a state transition path through the state machine wherein each state transition path is assigned a probability value, these probability values being used for generating a Receiver Operating Map; developing a probabilistic analysis of the behavior of the state machine; determining if a transition path condition is satisfiable by transforming the plurality of transition path conditions into a set of linear constraints on variables; and constructing a Receiver Operating Map using an acoustic Receiver Operating Curve and probabilities of knowledge error to map a set of thresholds, or more generally system parameters, to a false accept rate and a false reject rate, wherein Receiver Operating Map is a function of a plurality of thresholds/parameters with an output selected from one of accept rate and reject rate; tuning thresholds and system parameters by visually or analytically examining and optimizing over the Receiver Operating Map.

BRIEF DESCRIPTION OF THE DRAWINGS

The foregoing and other objects, aspects, and advantages of the present invention will be better understood from the following detailed description of preferred embodiments of the invention with reference to the accompanying drawings that include the following.

DETAILED DESCRIPTION OF THE PREFERRED EMBODIMENT

Figure 1:
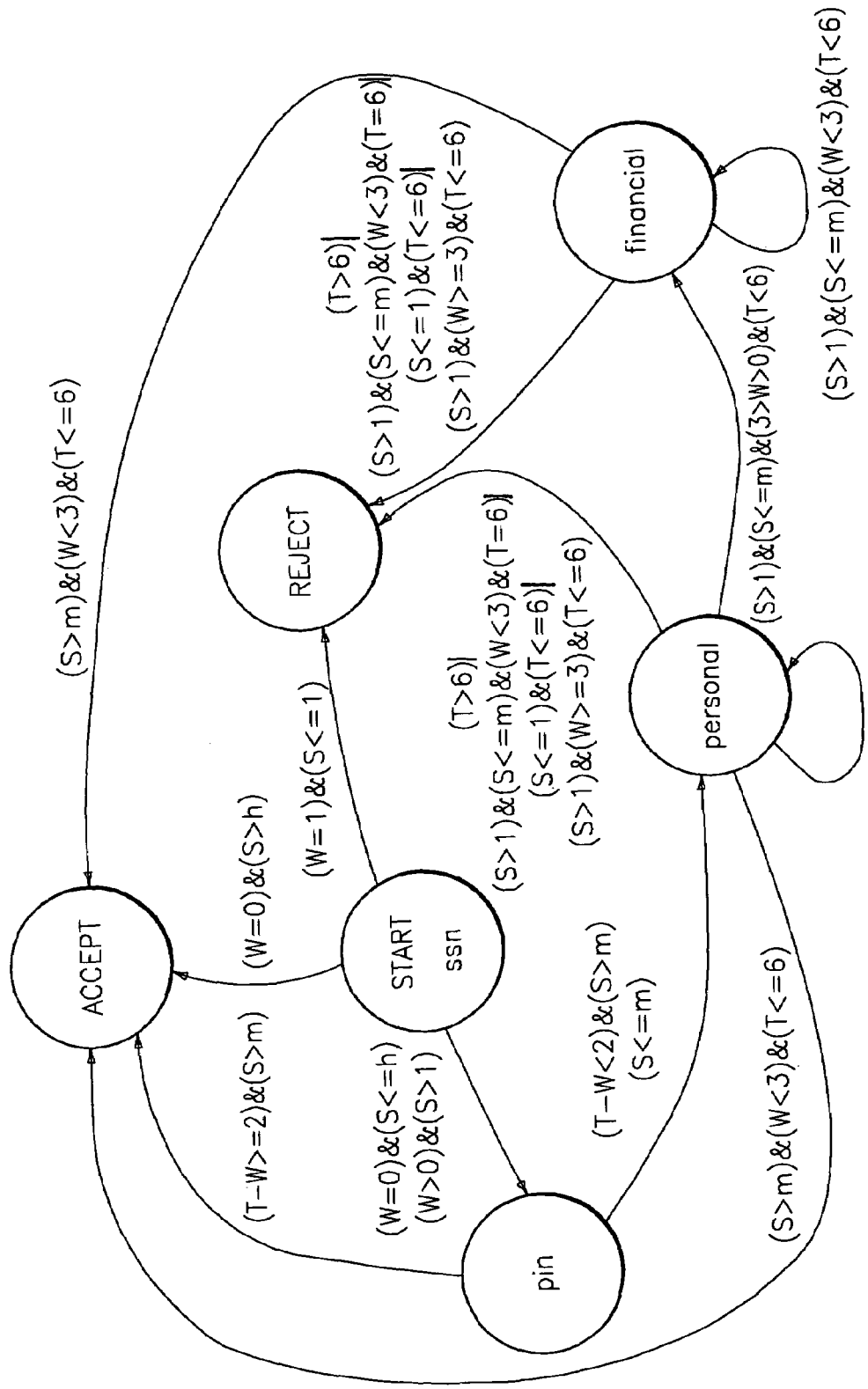
FIG. 1 is a state diagram illustrating an example of a policy state machine.

Preferred embodiments of the present invention will now be described in detail herein below with reference to the annexed drawings. In the drawings, the same or similar elements are denoted by the same reference numerals even though they are depicted in different drawings. In the following description, a detailed explanation of known functions and configurations incorporated herein has been omitted for conciseness.

Conversational Biometrics (CB) (see Ramaswamy) combines speech and speaker recognition technologies to validate an identity claim. A CB session is a turn based directed dialog where claimant's responses to posed questions and auxiliary information constitute a dynamic context based on which a decision is made, e.g., "accept", "reject", or "continue to another question". The speech input is analyzed with respect to a voiceprint match as well as knowledge, or the information content of the speech, match. Accordingly, speaker models have both an acoustic component and a knowledge profile. The knowledge profile can be represented as a table of questions and speaker specific answers. In general, however, the profile can contain more information. The acoustic model is based on the Gaussian Mixture Model—Universal Background Model (GMM-UBM) framework described in G. N. Ramaswamy, J. Navratil, U. V. Chaudhari, R. D. Zilca, "The IBM System For The NIST 2002 Cellular Speaker Verification Evaluation", ICASSP-2003, Hong Kong, April, 2003, and D. A. Reynolds, T. F. Quatieri, and R. B. Dunn, "Speaker Verification Using Adapted Gaussian Mixture Speaker Models", Digital Signal Processing, Vol. 10, Nos. 1-3, January/April/July 2000. The acoustic scores are based on the likelihood ratio statistic, whereas knowledge match is taken to be binary.

The dialog in a CB session is guided by a verification policy, which can be represented as a finite state machine (Policy State Machine). The following assumptions are made: the Policy State Machine is defined by a set of states, each with a specified set of questions or, more generally, topics, and possible transitions to be taken if the associated condition is satisfied. The transition conditions partition the decision variable space, and so only one condition can ever be valid. The conditions themselves are Boolean expressions with intermediate values determined by expressions with relational and binary operators on the decision variables, which can represent quantities such as the number of correctly answered questions, the acoustic score, etc. Exemplary Policy state machine specifications are considered below using the illustration shown in FIG. 1. The states, except for ACCEPT and REJECT which are terminal, have topics which indicate their question pool and the transitions are labeled with conditions. The particular example presented in FIG. 1 includes the following states: START, REJECT, ACCEPT, PIN, PERSONAL, and FINANCIAL.

The expressions for the conditions use a number of variables and constants. There are three acoustic score thresholds: low (l), medium (m), and high (h). The variables are:

T=Number of topics covered before assessing the transition conditions,

W=Number of topics covered for which the answer given was incorrect, and

S=the current acoustic score (described below in more detail).

Accordingly, the state transition machine illustrated in FIG. 1 can be described as Follows:

In the START state, three transitions may be performed:

If (W=l)&(S<=l), the machine transitions to the REJECT state;

If (W=0)&(S>h), the machine transitions to the ACCEPT state; and

If (W=0)&(S<=h)|(W>0)&(S>l), the machine transitions to the PIN state.

In the PIN state, two transitions may be performed:

If (T−W>=2)&(S>m), the machine transitions to the ACCEPT state; and

If (T−W<2)&(S>m)|(S<=m), the machine transitions to the PERSONAL state.

In the PERSONAL state, four transitions may be performed:

If (S>l)&(S<=m)&(W=0)&(T<6), the machine loops and stays in the PERSONAL state;

If (T>6)|(S>l)&(S<=m)&(W<3)&(T=6)|(S<=l)&(T<=6)|(S>l)&(W>=3)&(T<=6), the machine transitions to the REJECT state;

If (S>m)&(W>3)&(T<=6), the machine transitions to the ACCEPT state; and

If (S>l)&(S<=m)&(3>W>0)&(T<6), the machine transitions to the FINANCIAL state.

In the FINANCIAL state, three transitions may be performed:

If (T>6)|(S>l)&(S<=m)&(W<3)&(T=6)|(S<=l)&(T<=6)|(S>l)&(W>=3)&(T<=6), the machine transitions to the REJECT state;

If (S>l)&(S<=m)&(W<3)&(T<6), the machine loops and stays in the FINANCIAL state; and If (S>m)&(W<3)&(T<=6), the machine transitions to the ACCEPT state.

A CB session generates a path through the state machine, which consists of the following steps:

1. asking a question associated with a state, initially the start state, that has not been asked before on the path,
2. obtaining the response and score, and
3. processing the conditions associated with the state transitions in a sequential or random manner until one is satisfied;
4. performing the corresponding transition; and
5. repeating the process (steps 1 to 4) at the next state, unless it is a terminal state, whereupon an accept or reject decision is made.

The use of a verification policy implies that the analysis of the overall system performance is not straightforward, because for example the different components may give contradictory evidence. Herein a probabilistic analysis of the behavior of the policy state machine is developed, which affords a general view of system performance and which furthermore facilitates the tuning of parameters.

Let P=set of all possible paths determined by the topographical structure of the Policy State Machine. Policy analysis first determines $P_{sat} \subset P$=subset of paths which are allowed (satisfiable) by the transition conditions via a recursive procedure which starts in the initial state of the policy and follows paths depending on whether or not the conditions associated with the state transitions can be satisfied. Subsequently, each path is assigned a probability leading to the generation of the Receiver Operating Map, which will be described below in more detail. Note that the transition conditions in FIG. 1 ensure a finite number of paths.

To determine if a path condition is satisfiable, transition conditions are transformed into a set of linear constraints on variables. These constraints are propagated along the given path. At any point in the path, the linear constraints can be analyzed to determine whether or not a solution exists. A Linear Program is constructed from the set of constraints and solved. The feasible set is analyzed to determine the nature of the solutions possible for the program. If the feasible set is empty, then that sequence of transitions is not possible. If desired, the objective function for the Linear Program can be constructed to find the volume of scores and variable values that determine that path. In general, the nature of the variables requires a Mixed Integer (MI) Program.

Variable Transformation

To facilitate the analysis, the variables in the transition conditions must be represented as sums of variables up to the current depth, which is equal to the number of turns completed in the dialog. Thus, $T=\Sigma^{depth}_{i=1} q_i$, where $q_i$ is the indicator function indicating if a question was asked at turn i. $W=\Sigma^{depth}_{i=1} w_i$, where $w_i$ is the indicator function indicating if an incorrect answer was given at turn i. $S=\Sigma^{depth}_{i=1} \delta_i$, where $\delta_i$ is the change in acoustic score for turn i.

Condition Transformation

Then, for example, a condition such as $$(T=3) \ \& \ (W=2) \ \& \ (S \leq 3.4) \quad (1)$$

at depth=3 (where &≡AND) is transformed to $q_1+q_2+q_3 \ 3$ $-q_1-q_2-q_3 \ -3$ $w_1+w_2+w_3 <= 2$ $-w_1-w_2-w_3 \ -2$ $\delta_1+\delta_2+\delta_3 \ 3.4$ $1 \leq q_i \leq 1, w_i CE\{0,1\}, LB \leq \delta_i \leq UB,$ where LB and UB are lower and upper bounds derived from the acoustic ROC data. A long path will have many such combinations and the associated linear (MI) Program will be large.

For a path to be viable, all conditions that are associated with the sequence of transitions needed to generate the path must be satisfied. This determination is made at any point in the path by transforming and propagating the constraints through the path to that point and solving the associated program. As an example, consider two segments of one possible path through the policy: Condition (1) yields the first transition, followed by condition (2) (|≡OR) for the second transition (at depth=4).

$$((T-W \leq 2) \ \& \ (S \geq 4.0)) | (S \geq 5.1) \quad (2)$$

Combining (1) and (2) gives (OR and AND are used for emphasis):

(T=3) & (W=2) & (S≤3.4) AND [((T-W≤2) & (S≥4.0))|(S≥5.1)]

which is the same as:

(T=3) & (W=2) & (S≤3.4) & (T-W≤2) & (S≥4.0))

OR (T=3) & (W=2) & (S≤3.4) & (S≥5.1)

and which corresponds to the following set of ORed programs (bounds as before):

$q_1+q_2+q_3 \ 3$ $-q_1-q_2-q_3 \ -3$ $w_1+w_2+w_3 <= 2$ $-w_1-w_2-w_3 \ -2$ $\delta_1+\delta_2+\delta_3 \ 3.4$ $q_1+q_2+q_3+q_4-w_1-w_2-w_3-w_4 \ 2$ $-\delta_1-\delta_2-\delta_3-\delta_1 \ 4.0$

OR $q_1+q_2+q_3 \ 3$ $-q_1-q_2-q_3 \ -3$ $w_1+w_2+w_3 <= 2$ $-w_1-w_2-w_3 \ -2$ $\delta_1+\delta_2+\delta_3 \ 3.4$ $-\delta_1-\delta_2-\delta_3-\delta_1 \ -5.1$ One purpose of the ROC curve is to map a threshold to false accept and false reject rates. Here a Receiver Operating Map (ROM) is defined as a function of the multiple thresholds, or in general the parameters in the policy. The output can be either the "accept rate", which is the probability of ending up in the ACCEPT state or the reject rate=1—accept rate, which is the probability of ending up in the REJECT state. The interpretation of the output of the map, i.e., whether it is the false accept rate or the false reject rate, is dependent on whether a target or non-target (imposter) session is assumed. The ROM surface is generated by calculating these values over a grid in a volume of threshold (parameter) values. The first step is to associate with each condition, a probability (or density where appropriate) of occurrence by treating each variable in the policy as a random variable with a known or derived distribution. For example, let p(S) be the distribution of the score variable for a target model. It is used, along with the non-target distribution, in determining the acoustic only ROC curve. This is the distribution used on the first point in the path. At the second point, the distribution is conditioned on the transition condition that was satisfied to bring the system to the current state (point in the path). Here it is assumed that if the first condition contained the statement S>1.1, then the new score distribution is p(S|S>1.1), which is easily derivable from p(S), etc. for subsequent path points. The distributions depend on the depth along the path and previous variable observations. Note that the analysis is simplified by expanding the policy state machine, replacing a transition whose condition has ORed components with a set of individual transitions for each component. For the present, assume that the acoustic score, T, and W are conditionally independent given whether the session is target or non-target. The value of W is based on the (hypothesized) probability of having a given piece of knowledge, i.e., the likelihood that a target will know the answer to a particular topic question as well as the likelihood that a non-target will know the answer. These may be determined, for example, via the difficulty of the questions, or by empirical evidence. Since the transition conditions for each state partition the decision variable space, the sum of the probabilities of all allowable (satisfiable) paths from the start node to the ACCEPT and REJECT nodes is 1. Given the probability assignments, the ROM can be specified. Let $P_{accept} \subset P_{sat}$ be the subset of paths that end in the ACCEPT state and $P_{reject}$, the subset that end in the REJECT state. Let $t^-$ be a threshold vector defined by the grid. Then the specification of the ROM is the computation, for every $t^-$ in the grid, of $Prob[P_{accept}|t^-]$=the sum of the probabilities of all paths in $P_{accept}$ given $t^-$.

Figure 2:
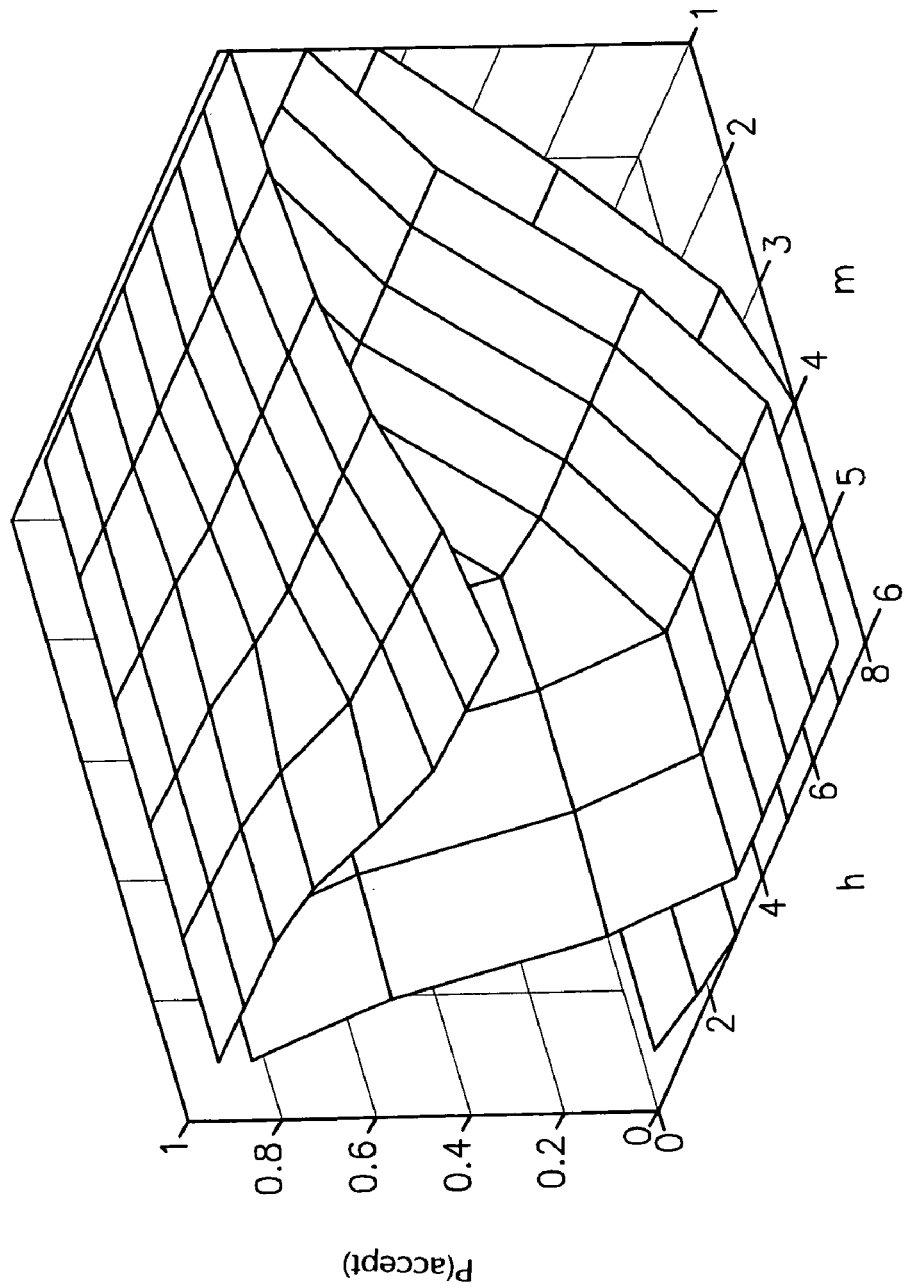
FIG. 2 is a three dimensional graph illustrating Receiver Operating Curve Probability of Accept Surfaces (1=−0.5)

Consider, again, the policy state machine specifications shown in FIG. 1. Define a grid of threshold values (see description of FIG. 2 below) in 3 dimensions, one each for the low (l), medium (m), and high (h) score thresholds. For each threshold vector given by the grid, a probability of accept (1−reject) is computed as outlined above. FIG. 2 shows the resulting ROM surfaces ($R^2 \rightarrow R$, or accept rate as a function of m and h, where l is kept constant) for three different classes of users for the policy in FIG. 1 (the h axis ranges from 1 to 8 corresponding to unit threshold increments from 0 up to 7, and the m axis runs from 1 to 6 corresponding to unit threshold increments from 0 up to 5, the low threshold is fixed at −0.5). The upper surface corresponds to targets, who are the correct speakers. The middle surface corresponds to informed imposters, i.e., impersonators who have gained access to the correct knowledge. The lowest surface corresponds to uninformed imposters, who are impersonators without correct knowledge. Each class of user corresponds to different probability assignments for the transition conditions, determined by the input score distribution, which here is taken from real usage of the policy in FIG. 1, and the input probability of errors for the questions for both targets and non-targets. The latter can be estimated from the complexity of the questions, the speech recognition error rate, etc. In this analysis, they were kept fixed at 0.05 for the targets and 0.95 for the non-targets, rates that were consistent with empirical results.

FIG. 2 clearly highlights the fact that a poor choice of thresholds will make the system unusable, even if the components themselves perform well. Thus, a method to properly set the thresholds can be developed. Given that the probabilities of accept and reject can be computed for targets and imposters, we can compute the values of the Detection Cost Function (DCF), a weighted combination of false accept and false reject rates, defined for the National Institute of Standards and Technology (NIST) Speaker Recognition Evaluations, described in "The NIST Year 2002 Speaker Recognition Evaluation Plan", NIST, 2002, as a function of the dimensions (thresholds). This generates a corresponding surface to the ROMs.

Figure 3:
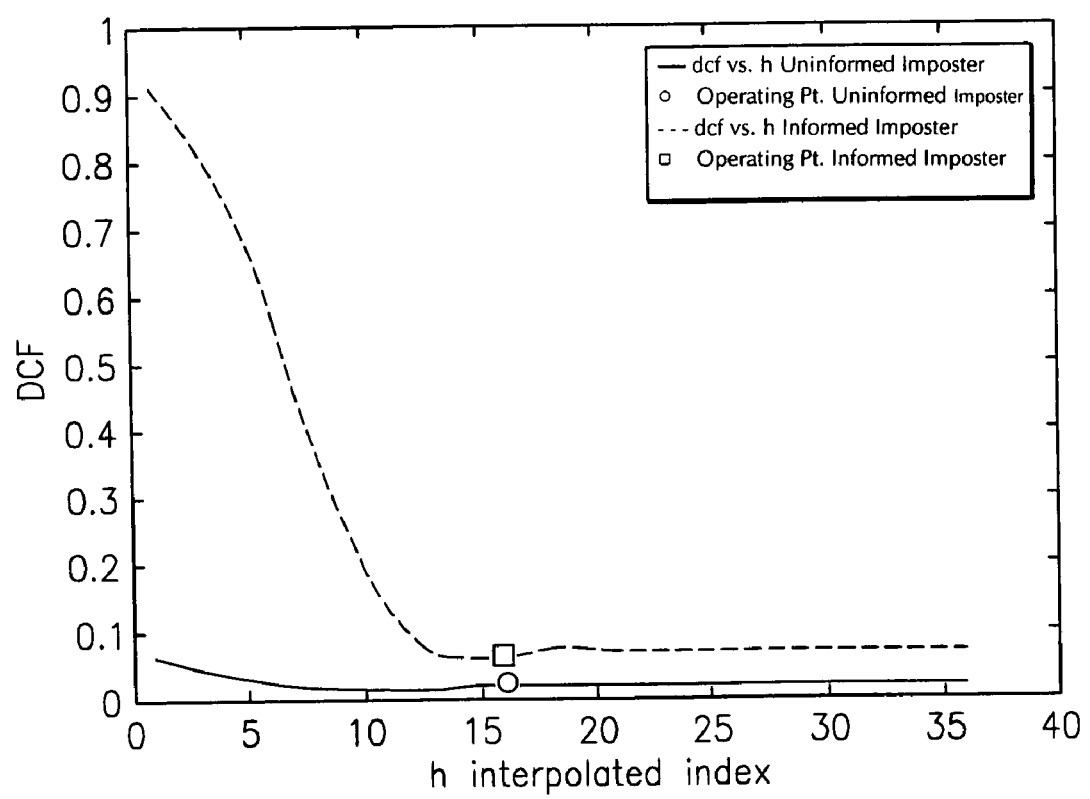
FIG. 3 is a two dimensional graph illustrating Detection Cost Function (based on the Receiver Operating Map) Surface Slice at m=3.0 with 36 point interpolation over h.

FIG. 3 shows a slice of the DCF surface at m=3.0 for both an informed and uninformed imposter. The slice is interpolated over the h axis on 36 equal spaced points from 1 to 7. The values to which the curves converge depend on the fixed thresholds and could be reduced by their adjustment. Note that as h is reduced, an informed imposter will readily be accepted. To understand the predictive power of this analysis, also shown as circles and squares are the locations of the hand tuned operating points for real test data generated during use of the policy. Optimization (minimization) along the DCF slices yields performance very close to the hand tuned operating points. This remains true for other slices at different thresholds, suggesting that searching for the minimum point on the full DCF surface is a good way to automatically set the multiple thresholds. This range of thresholds is also indicated in FIG. 2 by the contrasting rectangles.

The present invention, therefore, presents a method to analytically and graphically assess the error rates associated with policy based verification procedures whose evolution is controlled by a state machine with transitions conditioned on the context of the process. The ROM was developed as a graphical means to view system performance and replaces the ROC for these complex verification systems. Analysis based tuning of threshold parameters is also presented, as well as evidence to show that it agrees with actual performance data. The tuning may be performed by visually or analytically examining and optimizing over the ROM. Other applications, such as policy based dialog management systems may also benefit from the presented analysis methods.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of assessing error rates and tuning parameters associated with policy based procedures for verification of a plurality of known speakers through use of conversational biometrics, evolution of the policy based procedures being controlled by a state machine and each of the plurality of known speakers has an associated acoustic component and a knowledge profile, the method comprising the steps of:

performing a policy based verification using a finite state machine defined by a set of states, each state having a specified set of questions and a plurality of possible state transitions, a state transition being performed if a condition of a state transition path associated with the state transition is satisfied;

determining allowability of the condition;

generating a state transition path through the state machine;

identifying all allowable state transition paths;

developing a probabilistic analysis of the behavior of the state machine, wherein each allowable state transition path is assigned a probability value;

generating a Receiver Operating Map (ROM) by using said probability values;

mapping a set of thresholds/parameters to a false accept rate and a false reject rate by using a multidimensional acoustic Receiver Operating Curve and probabilities of knowledge error, wherein the ROM is a function of a plurality of the thresholds/parameters with an output selected from one of accept rate and reject rate; and tuning said thresholds/parameters by visually or analytically examining and optimizing over the ROM.

2. The method of claim 1, wherein allowability of the condition is determined by transforming a plurality of conditions into a set of linear constraints or variables and determining a feasible set.

3. The method of claim 1, wherein the performing step further includes analyzing speech input of said known speakers with respect to the acoustic component and the knowledge profile of the speech input.

4. The method of claim 3, wherein the acoustic component is based on a likelihood ratio statistic and the knowledge profile is represented as a table of questions and answers that are specific to each of the plurality of said known speakers.

5. The method of claim 1, wherein the condition includes a plurality of variables and a plurality of constants, the plurality of constants including three acoustic score thresholds/parameters: low (l), medium (m), and high (h) and the plurality of variables include T, a number of topics covered before transition path conditions are assessed, W, a number of topics covered for which the answer given was incorrect, and S, a current acoustic score threshold/parameter.

6. The method of claim 1, wherein the step of generating a state transition path further comprises the steps of:

a) asking a question associated with a state, the question have not been asked before on the state transition path, b) obtaining a response to the asked question and a response score threshold/parameter, c) processing the conditions until one condition is satisfied;

d) performing the state transition corresponding to the condition; and e) repeating steps a) to d) if a present state is not a terminal state and otherwise, making a decision of generating an ACCEPT or REJECT state.

7. The method of claim 6, wherein the step of generating a state transition path is simulated.

8. The method of claim 1, wherein for the step of identifying is determined according to whether a full linear or mixed integer program of the state transition path is solvable.

9. The method of claim 1, wherein the probability value of the accept rate is a probability of transitioning to an ACCEPT state and the probability value of the reject rate is a probability of transitioning to a REJECT state, the probability value of the reject rate is indicated as 1−accept rate.

10. The method of claim 9, wherein the probability of transitioning to an ACCEPT state is the probability of all state transition paths leading to the ACCEPT state and the probability of transitioning to a REJECT state is the probability of all paths leading to the REJECT state.

11. The method of claim 10, wherein the step of generating a ROM further comprises the steps of:

defining a grid of threshold/parameter values in a plurality of dimensions, wherein one dimension is allocated to each of low, medium, and high score threshold/parameters;

computing the probability value of the accept rate, or probability value of the reject rate for each set of threshold/parameter values given by the grid;

creating a visual representation of the accept or reject rates as a function of the threshold/parameter values given by the grid; and creating a representation of the accept or reject rates as a function of the threshold/parameter values given by the grid.

12. The method of claim 11, wherein an upper surface of the ROM corresponds to a correct speaker of the plurality of known speakers, a middle surface corresponds to informed impersonators who have gained access to knowledge associated with the known speaker, and the lowest surface corresponds to uninformed impersonators who do not have knowledge associated with the known speaker.

13. The method of claim 11, wherein the tuning step further comprises the step of determining one or more desirable points in the ROM, based on the probabilities of accept rate and reject rate for target known speakers and one or more impersonators of known speakers, wherein said determining is performed using visual inspection of the ROM.

14. The method of claim 11, wherein the tuning step further comprises the steps of:

evaluating regions of the ROM using analytical methods; and determining one or more desirable points in the ROM based on the probabilities of accept rate and reject rate for target known speakers one or more impersonators of known speakers, wherein said determining is performed via analytical optimization.

15. The method of claim 14, wherein the analytical optimization maximizes an objective function.

16. The method of claim 14, wherein the analytical optimization minimizes an objective function.

17. A method of assessing error rates and tuning parameters associated with policy based procedures for verification of a plurality of known speakers through use of conversational biometrics, evolution of the policy based procedures being controlled by a state machine and each of the plurality of known speakers has an associated acoustic component and a knowledge profile, the method comprising the steps of:

performing a policy based verification using a finite state machine defined by a set of states, each state having a specified set of questions and a plurality of possible state transitions, a state transition being performed if a condition of a state transition path associated with the state transition is satisfied;

generating a Receiver Operating Map (ROM) by using a plurality of probability values;

mapping a set of thresholds/parameters to a false accept rate and a false reject rate by using a multidimensional acoustic Receiver Operating Curve and probabilities of knowledge error, wherein the ROM is a function of a plurality of the thresholds/parameters with an output selected from one of accept rate and reject rate; and utilizing the mapped set of thresholds/parameters in a speaker recognition process.

18. The method of claim 17, further comprising the steps of:

developing a probabilistic analysis of the behavior of the state machine, wherein each allowable state transition path is assigned a probability value;

determining allowability of the condition;

generating a state transition path through the state machine; and identifying all allowable state transition paths.

19. The method of claim 17, further comprising a step of tuning said thresholds/parameters by examining and optimizing said thresholds/parameters over the ROM, wherein said examining and optimizing is performed by a method selected from a visual and analytical.

20. The method of claim 17, wherein the condition includes a plurality of variables and a plurality of constants.

* * * * *